United States Patent [19]
Ying-Che

[11] Patent Number: 5,779,418
[45] Date of Patent: Jul. 14, 1998

[54] QUICK-SETTING NUT

[76] Inventor: Lin Ying-Che, No. 57, Chin-Hua St., Erh-Chia Tsun, Liu-Chia Hsiang, Tainan Hsien, Taiwan

[21] Appl. No.: 796,440

[22] Filed: Feb. 10, 1997

[51] Int. Cl.[6] ............................................. F16B 37/08
[52] U.S. Cl. ...................................... 411/433; 411/540
[58] Field of Search .............................. 411/432, 433, 411/427, 540

[56] References Cited

U.S. PATENT DOCUMENTS

| | | | |
|---|---|---|---|
| 1,021,110 | 3/1912 | Niewohner | 411/433 |
| 1,327,417 | 1/1920 | Barton | 411/540 |
| 1,597,525 | 8/1926 | Knake | 411/540 |
| 3,815,434 | 6/1974 | Seger | 411/433 |
| 4,132,146 | 1/1979 | Uhlig | 411/433 |

*Primary Examiner*—Flemming Saether
*Attorney, Agent, or Firm*—Morton J. Rosenberg; David I. Klein; Jun Y. Lee

[57] ABSTRACT

The present invention provides a quick-setting nut, which uses two half connecting blocks linking together to form an integral nut by pivoting on a rivet at one side thereof and locking together with a half lap lock as a projection embedding in a recess between the interfaces thereof at other side of which. In practising, the unfolded present invention can be closed at a desired position on the long bolt, and with the aid of a slotted hole at one side of the pin joint portion sliding on the rivet, the inside threads of the nut can engage with or disengage from the long bolt for bolting up or removing.

2 Claims, 7 Drawing Sheets

5,779,418

1
QUICK-SETTING NUT

BACKGROUND OF THE INVENTION

(1) Field of the Invention

The present invention relates to a quick-setting nut, and more particularly to a nut which is not only quick-set at a desired position, but also quick-detached from any proper position on a long bolt without bolting in or out for a whole length of the great long bolt to take a bore time.

(2) Description of Prior Art

Co-operating with a nut, bolt-setting is applied in many different kinds of products, but especially to a long bolt, in order for avoiding the nut from taking much time for a bolt to the setting position, a quicksetting nut is developed. As shown in FIG. 5 and FIG. 6, there are two prior related cases, wherein, one of which, as shown in FIG. 5, consists of a bigger nut and two half sheathes having inner and outer threads, in which the two half sheathes are attached at a desired position nearing the setting position on the long bolt immediately for quick-bolting up by bolting the inside thread of the nut and the outer thread of the sleeve consisting of two half sheathes altogether. In this case, the mechanism is composed of three individual components, it takes times when sticking on the bolt, and the components may be lost easily. The other of which, as shown in FIG. 6, includes an adjustable sleeve block, a quick-setting bar and a spring, in which there is a cross blind-hole crossing the main hole in the adjusting sleeve block for the spring and the quick-setting bar setting therein respectively. The quick-setting bar having a slotted hole with threads on one side nearing the spring side for the long bolt passing through. When pressing the quick-setting bar inwardly to urge the spring so that the thread at the inside of the slotted hole of the quick-setting bar disengages from the long bolt, the adjusting sleeve block is sliding along the trunk of the long bolt freely and quickly to reach a desired position, then releasing the quick-setting bar and under the restore force of the spring. The thread in the inner portion of the slotted hole engages with the long bolt again for bolting up. To intensify the fixing force of the nut, the adjusting sleeve block extends a clamping ring outwardly with a thread at outer surface which is controlled by a nut. But in this case, the components of the mechanism are too many that the production cost is kept in a higher level, and due to the engagement between the nut and the long bolt depend on the half thread on the slotted hole of the quick-setting bar, the axial pushing force is very limited so that overloading of the bolting force will cause the half thread slides on the bolt and disable to meet the expected fixing force.

OBJECTS AND SUMMARY OF THE INVENTION

It is therefore one object of this invention to provide a nut which is not only quick-set at a desired position for bolting up but also quick-detachable from any proper position on a long bolt without bolting in or out for a whole length of the great long bolt to take a bore time. The present invention adapts two half connecting blocks linking together to form a nut by pivoting on a rivet at one side of which and locking together with a half lap lock as a projection embedding in a recess between the interfaces of them at other side of them. In practising, the unfolded present invention can be sealed at a desired position on the long bolt, and with the aid of a slotted hole at one side of the pin joint portion sliding on the rivet, the inside threads of the nut can engage or disengage with the long bolt for bolting up or removing.

2
BRIEF DESCRIPTION OF THE DRAWINGS

DETAILED DESCRIPTION OF PREFERRED EMBODIMENTS

Figure 1:
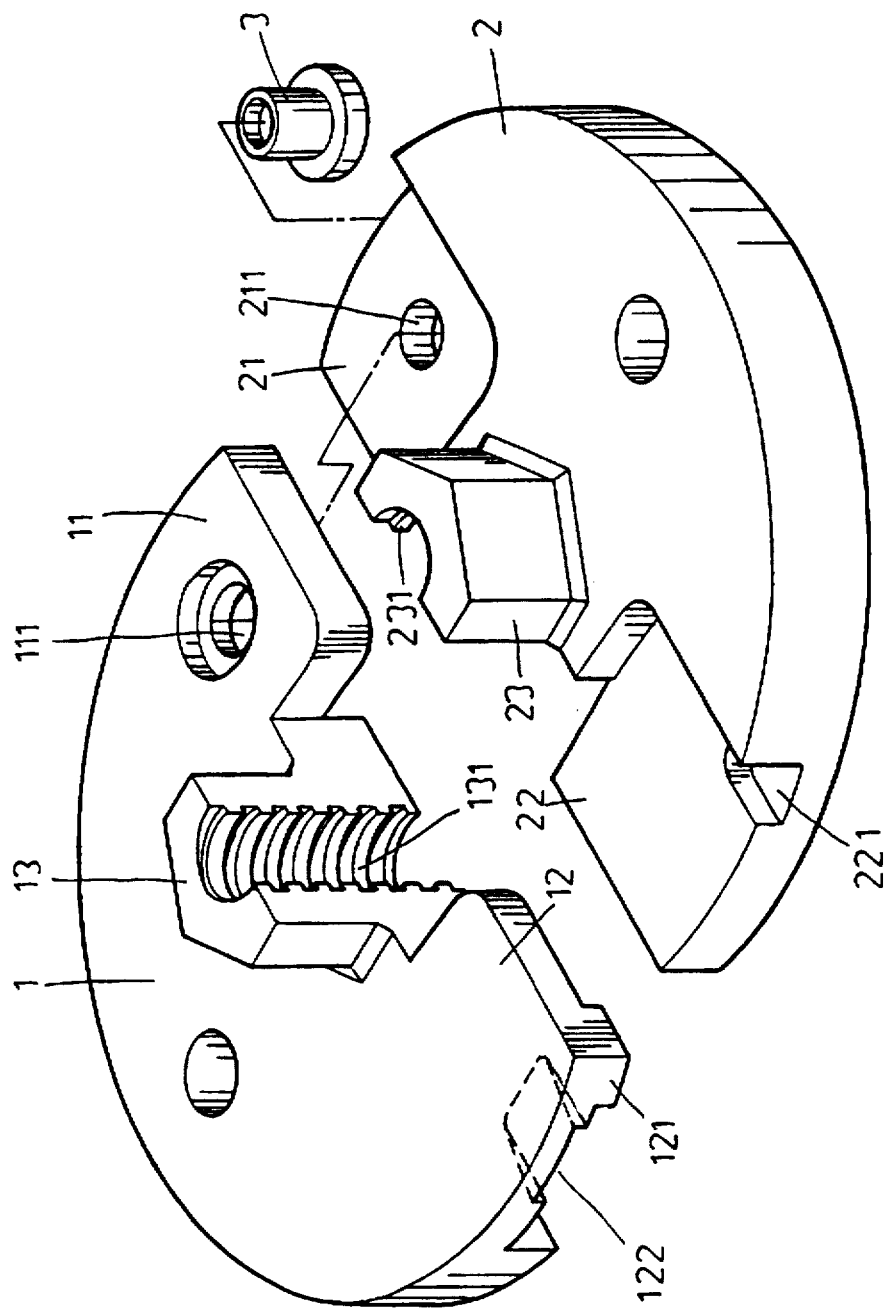
FIG. 1 is an exploded view of the present invention.

Referring to FIG. 1, the present invention includes two half connecting blocks 1 2 and a rivet 3.

The two half connecting blocks 1 and 2 can be linked together to form a cup dolly, therein they lap each other at both sides as one side forms to pin joint portions 11 and 21 and the other forms to lock joint portions 12 and 22. The pin joint portions 11 and 21 have a couple of corresponding hole 211 and slotted hole 111 for the rivet 3 fixing in the hole 211 and fitting into the slotted hole 111 as a truchoid so that the pin joint portion 11 not only pivots around the rivet 3, but also slides along the slotted hole 111 to other end to lock the two half connecting blocks 1 and 2. On the other side, the lock joint portions 12 and 22 have a couple of locking projection 121 and locking recess 221 on the interfaces for locking each other, and a beveled gap 122 formed on lapping interface of the lock joint portion 11 opening to the outside. The center portion is formed with a through threaded hole while the inside of a nut consisting of two threaded holes 131 and 231 of two half nuts 13 and 23.

Figure 2:
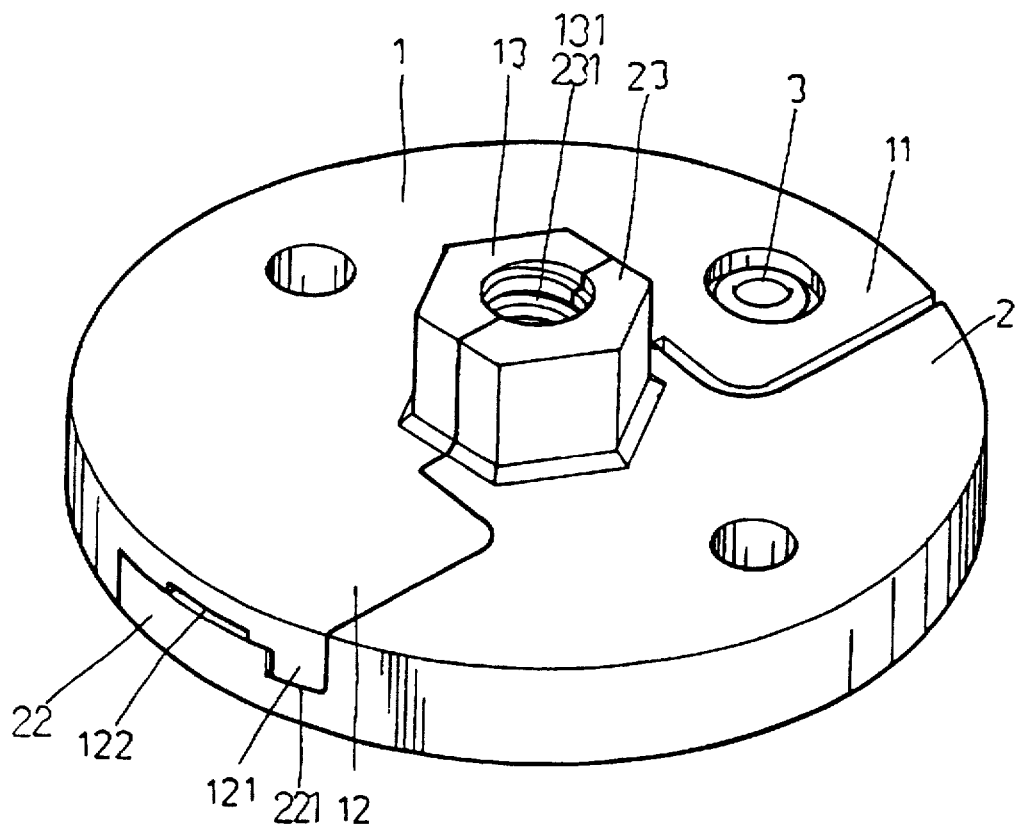
FIG. 2 is a perspective view of the present invention.
Figure 3:
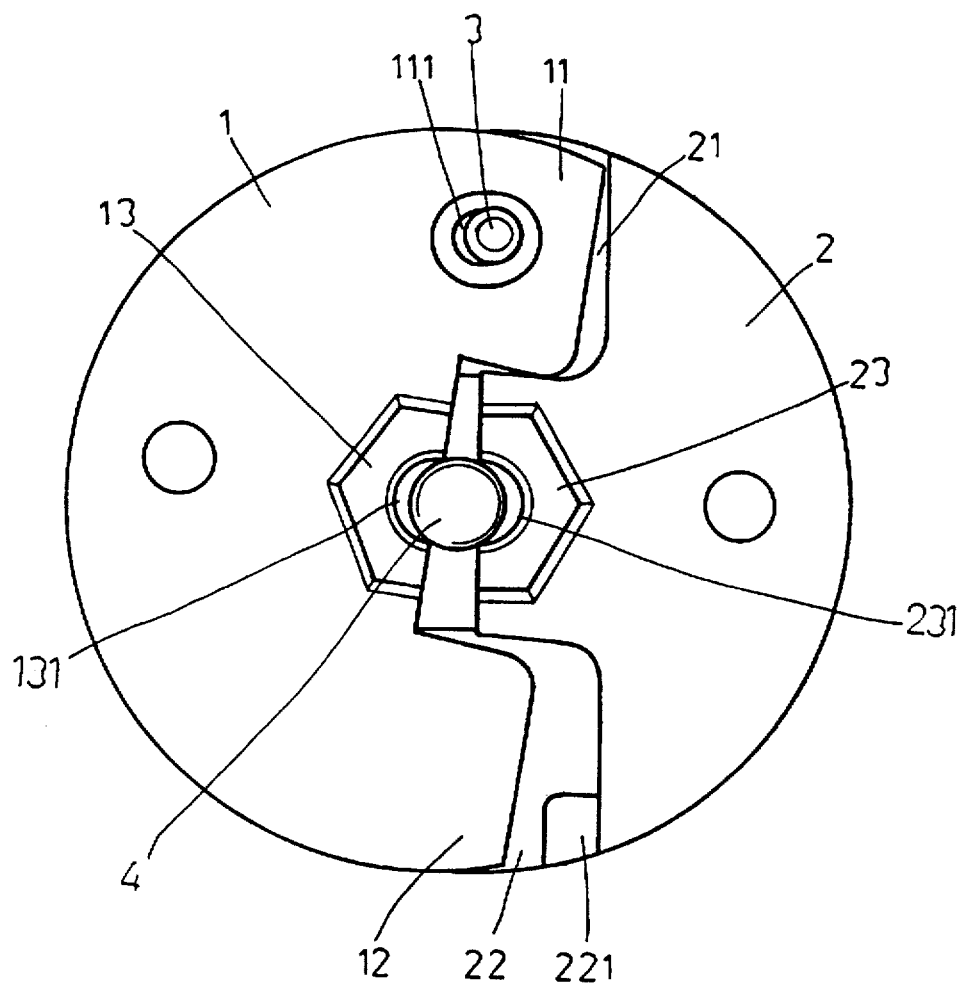
FIG. 3 is a side view showing unfolding a proper angle of the present invention.
Figure 4:
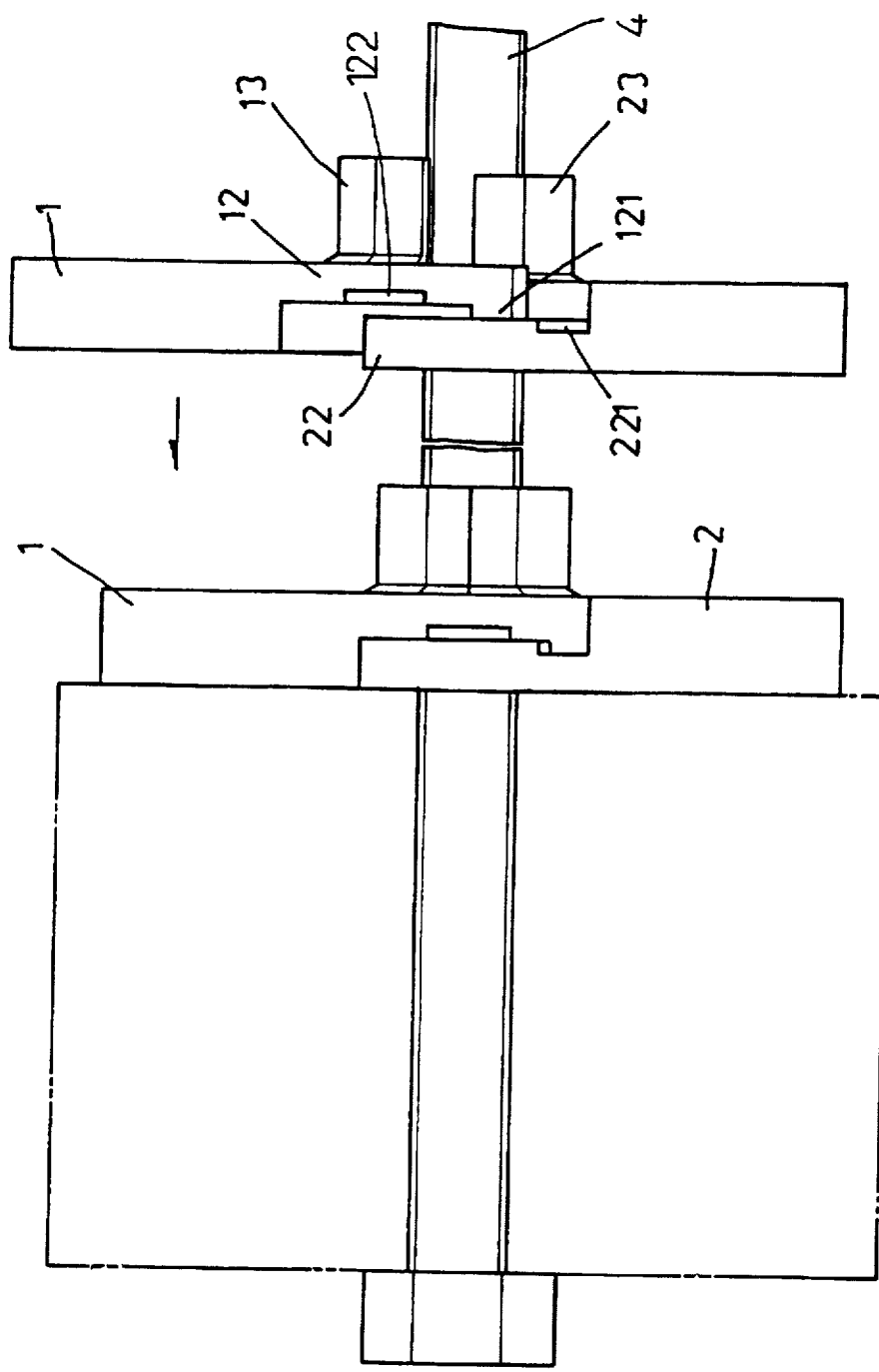
FIG. 4 is a side view showing an operation of the present invention.
Figure 5:
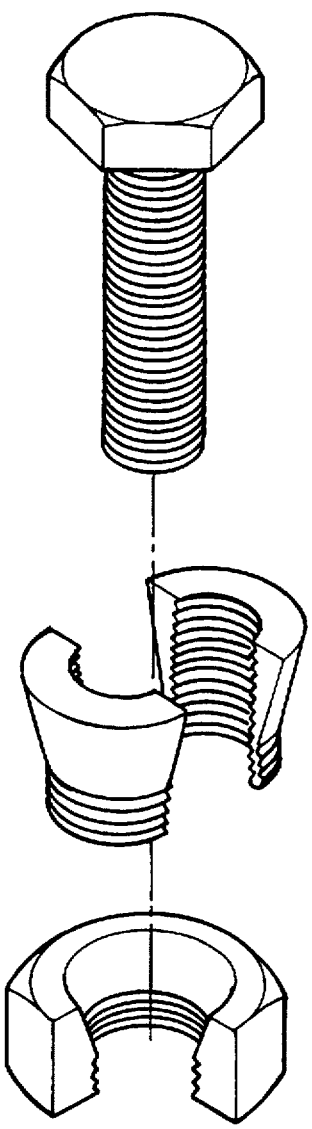
FIG. 5 is an exploded view of a first prior art.
Figure 6:
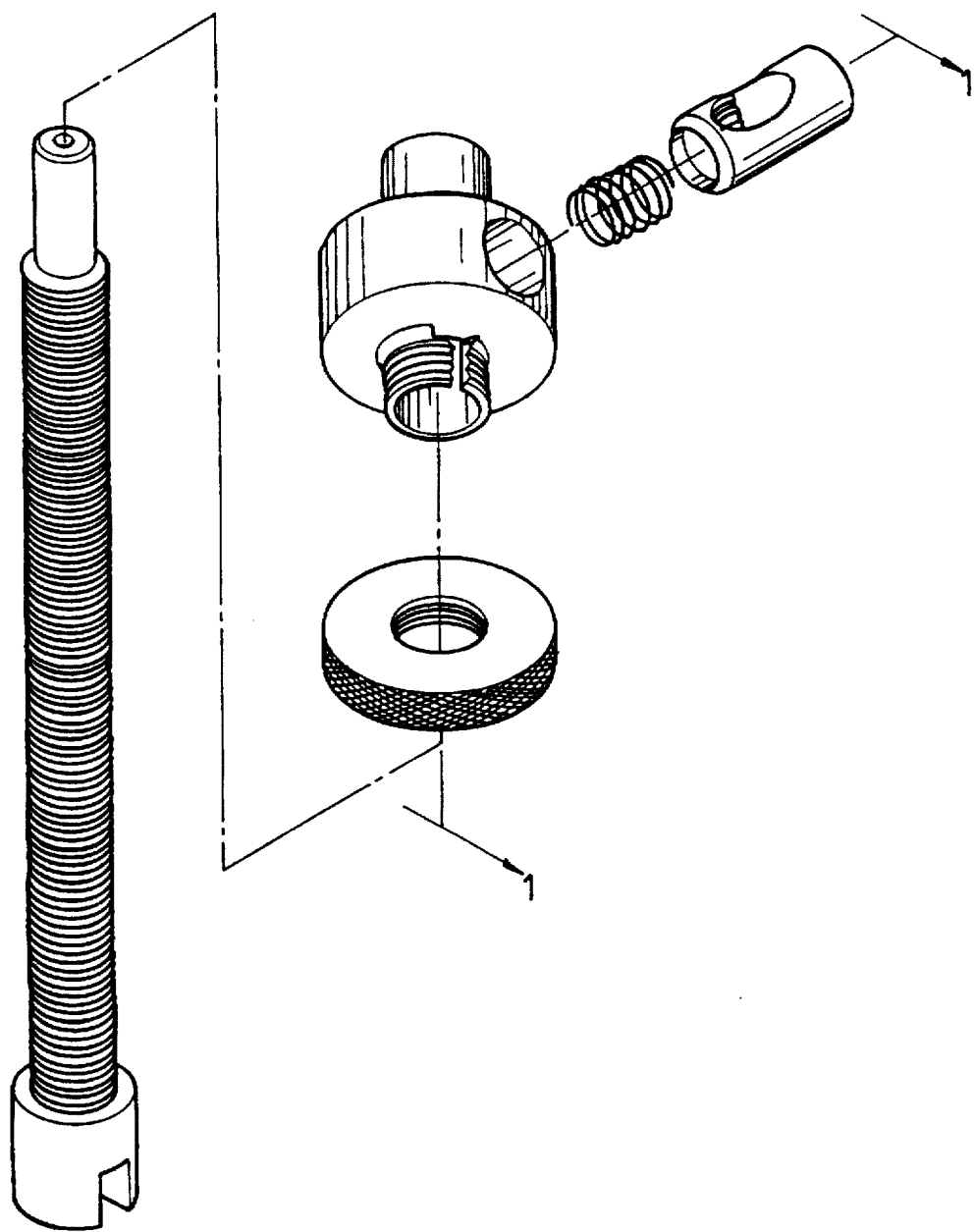
FIG. 6 is an exploded view of a second prior art.
Figure 7:
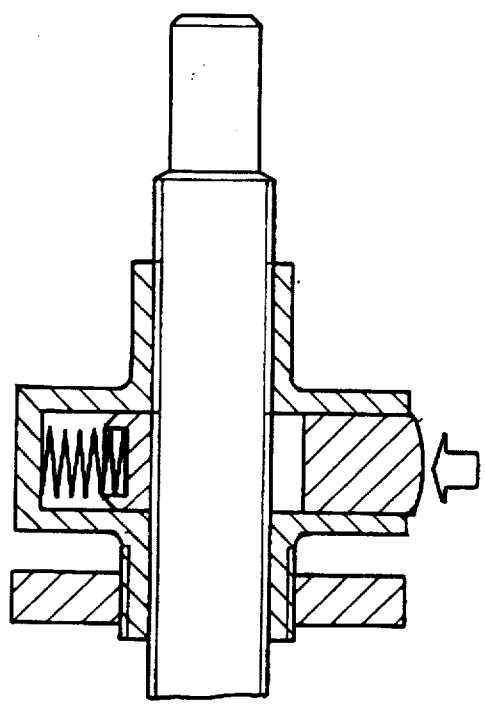
FIG. 7 is a cross-section view of FIG. 6.

Referring to FIG. 2, the two connecting blocks 1 and 2 are pivoted on the rivet 3 with the pin joint portions 11 and 21, co-operating with the lock joint portions 12 and 22, to form a folded nut for sticking on the long bolt 4, as shown in FIG. 3. When quick-mounting the nut to or removing the nut from the long bolt 4, pulling the pin joint portions 11 and 21 away forcing the rivet 3 to slide at one side of the slotted hole 111 so that the two connecting blocks 1 and 2 can be opened in an angle, meanwhile the threaded holes 131 and 231 opening an angle too, so as the threaded hole disengaging from the bolt 4 in order to force the bolt 4 passing through freely. When reaching a desired position, locking the two half connecting blocks 1 and 2 so that the projection 121 embeds into the recess 221 and the rivet 3 slides to the other end of the slotted hole 111 engaging the nut consisting of the threaded holes 131 and 231 to the long bolt 4 tightly, therefore the nut can be bolted on quickly, as shown in FIG. 4. Owing to the lapping interfaces of the two connecting blocks 1 2 is perpendicular to the clamping force, the clamping force resulting from bolting in of the bolt 4 can not open the two half connecting blocks 1 and 2 any more so that the quick-setting nut can be kept together as an integral even under a great bolting force.

If it is desire to remove the nut from the long bolt 4, firstly force the nut departing from the clamping state, then pulling the pin joint portions 11 and 21 away so that the rivet 3 slides to the other end of the slotted hole 111 to open the threaded holes 131 and 231 an angle to disengage from the bolt 4, finally releasing the lock of the lock joint portions 12 and 22 so as the projection 121 departing from the recess 221 and the quick-setting nut can be removed from the long bolt 4 immediately without bolting out for a long range. If the interfaces in the lock joint portions 12 and 22 are stained and stuck together which makes the nut difficult to be departed, inserting a rigid object, such as a standard screwdriver into the beveled gap 122 and pry the lock joint portions away.

I claim:

1. A quick-setting nut consisting of two half connecting blocks and a rivet, the improvements comprising:

said two half connecting blocks having upper and lower surfaces and being coupled together by said rivet, each of said two half blocks having a central portion with a threaded semi-cylindrical recess formed therein, each of said threaded semi-cylindrical recesses extending between said upper and lower surfaces and being disposed in aligned relationship to form a threaded hole when said central portions of said two half connecting blocks are disposed contiguously, each of said two half connecting blocks having a pin joint portion radially spaced from said centrally located semi-cylindrical recess and diametrically disposed lock joint portion, said pin joint portions being disposed in overlapping relationship and said lock joint portions being disposed in overlapping relationship, said pin joint portion of one of said two half connecting blocks having an aperture formed therethrough for receiving said rivet and said pin joint portion of said other half connecting block having a slotted opening formed therethrough disposed in aligned relationship with said aperture for passage of said rivet therethrough, whereby said two half connecting blocks are both pivotally and slidingly coupled together, said locking joint portion of one of said two half connecting blocks having a locking recess formed therein and said locking joint portion of said other half connecting block having a locking projection formed therein and disposed in corresponding relationship with said locking recess for releasable locking engagement therewith, wherein said two half connecting blocks are pivotally displaced to slide a bolt therebetween and subsequently lockingly engaged to contiguously dispose said central portions for threadedly engaging the bolt within said threaded hole.

2. The quick-setting nut as recited in claim 1 where one of said lock joint portions has a beveled gap formed therein for receiving a tool to separate said lock joint portions.

* * * * *